J. M. HANSEN.
DIES FOR REWORKING CAR WHEELS.
APPLICATION FILED DEC. 18, 1908.

1,087,582.

Patented Feb. 17, 1914.

WITNESSES.

INVENTOR.

UNITED STATES PATENT OFFICE.

JOHN M. HANSEN, OF PITTSBURGH, PENNSYLVANIA, ASSIGNOR TO FORGED STEEL WHEEL COMPANY, A CORPORATION OF PENNSYLVANIA.

DIES FOR REWORKING CAR-WHEELS.

1,087,582.   Specification of Letters Patent.   Patented Feb. 17, 1914.

Application filed December 18, 1908. Serial No. 468,147.

*To all whom it may concern:*

Be it known that I, JOHN M. HANSEN, a resident of Pittsburgh, in the county of Allegheny and State of Pennsylvania, have invented a new and useful Improvement in Dies for Reworking Car-Wheels; and I do hereby declare the following to be a full, clear, and exact description thereof.

My invention relates to apparatus for forging car wheels. Its object is to provide means for reforging car wheels after they have been worn and for supporting the web or spoke portion of such wheels while providing for the radial forging of the enlarged portions thereof, such as the forging of the rim portion outwardly to again build up the tread and flange and forcing the hub portion inwardly to reduce the size of the axle eye and provide for the fitting of the same upon a standard axle or one of the same diameter as that from which it was removed.

The apparatus is adapted for the practice of the invention set forth in an application filed by me June 13, 1908, Serial No. 438,421, and in Letters Patent No. 969,275, dated Sept. 6, 1910.

It consists, generally stated, in a supporting die conforming in shape to the cylindrical enlargement or enlargements of the wheel body, and forging mechanism acting with such supporting die to force the enlargement or enlargements of such wheel radially.

It also consists in certain other improvements as hereinafter described.

Figure 1:
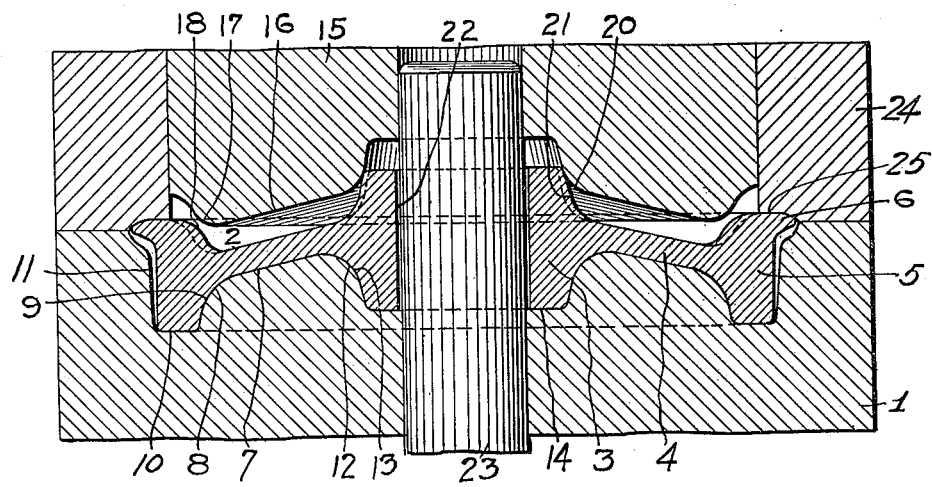
Figure 2:
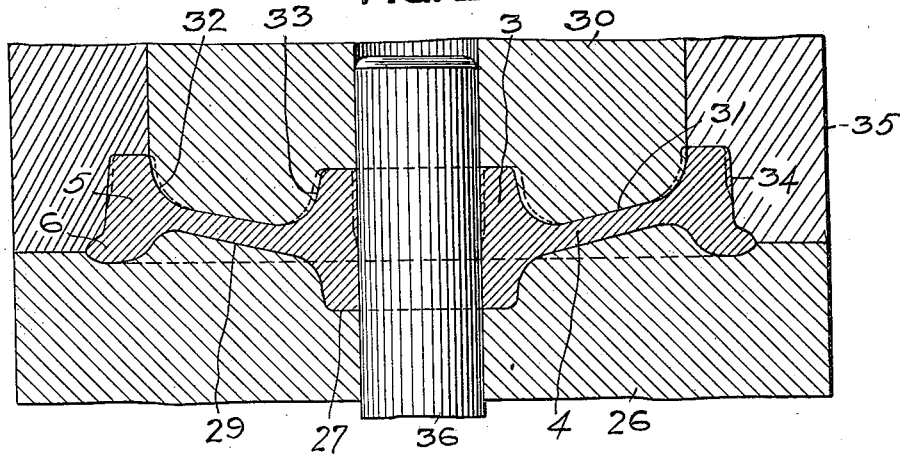
Figure 3:
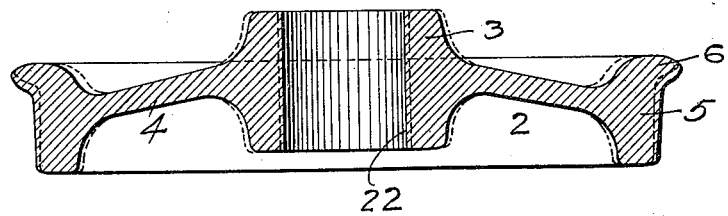

In the accompanying drawings Figure 1 is a cross section; Fig. 2 is a like cross section showing the forging operation upon the wheel when it is inverted; and Fig. 3 is a view of the wheel after the forging operation, indicating by dotted lines the operation thereon.

As illustrated in said drawings the lower die 1 conforms in shape to the body of the car wheel 2, said car wheel having the hub portion 3, web or spoke portion 4 and rim portion 5 with the flange portion 6. The bottom die has the face 7 conforming to the web 4 and the curved shoulder portion 8 fitting the inner face 9 of the rim 5; and it may also have a flat face 10 extending along the side face of the rim, and the tread and flange face 11 extending up in line with the tread of the wheel and forming such portion of the die corresponding in size and shape to the tread and flange of the finished wheel after forging. The die 1 is also illustrated as having the curved shoulder 12 corresponding to the face 13 of the hub and the flat face 14 extending along the edge portion of the hub, it being preferred that both rim and hub be forged at the same operation. The curved shoulder portion 8 supporting the inner face of the rim, the web supporting face 7, and the hub supporting shoulder portion 12 correspond in shape and size to the wheel before forging and give support to the same, so that in the forging operation the web or spoke portion thereof is fully supported and buckling, stretching or other distortion of the same during the reforging of the wheel is prevented. The upper die 15 has the face 16 corresponding in shape to the web 4, and it is provided with the shoulder or curved face 17 of greater diameter than the inner face 18 of the wheel rim, so that upon the forging stroke such annular forging face 17 will force the metal of the rim portion radially outwardly and cause it to fill up the die, forging it out to or toward the face 11 and filling up the worn portion of the tread and rim of the wheel. In like manner the die 15 has the annular forging face 20 of less diameter than that of the face 21 of the hub portion so that upon the forging stroke such forging face 20 will force the metal radially inwardly so as to reduce the axle eye 22. If such single forging stroke is all that is necessary for the reforging of the wheel I also employ in connection with the same the mandrel 23 entering within the eye so as to hold the metal against the forging stroke of the forging face 20 and properly distribute the metal so forced inwardly so as to fill up the eye sufficiently for re-boring to fit the standard axle. In connection with such forging stroke I also prefer to employ the ring die 24 which contacts with the edge face 25 of the rim so as to force the flange portion of the wheel downwardly into the seat 11 or confine it therein and enable the metal to fill such portion of the lower die and properly conform to the same.

The dies shown in Fig. 2 involve the same principle. These may be termed finishing reforging dies, and may be used in conjunction with the dies shown in Fig. 1, in which case the latter may be termed primary reforging dies. In this case the bottom die 26 conforms to the shape of the wheel after the first forging operation of the dies shown in Fig. 1, having the supporting shoulder or face 27 for the reforged portion of the hub and supporting shoulder or face 29 for the web. The top die 30 has the face 31 conforming to the web and the forging face 32 of greater diameter than the inner face of the rim so as to forge the same radially outwardly, and the forging face 33 of less diameter than the corresponding face of the hub so as to forge the hub portion inwardly. A forging face 34 corresponding to the finished tread and flange of the wheel to confine the same under the forging operation is also provided, preferably by means of a ring die 35. The central mandrel 36 is used to limit the movement of the metal inwardly during this latter forging operation;—that is, where the wheel is subjected to both reforging operations on both faces of the wheel, it is only necessary to employ a mandrel in connection with the second reforging operation.

The operation of the dies is as follows: The wheel to be re-forged is reheated and after such reheating is placed upon the lower die 1 and subjected to the forging operation between the two dies, the lower die supporting the wheel both in the web or spoke portion and at the hub or rim portion, while the upper die forges the wheel radially at the hub or rim portions or both, and if the wheel requires only the single forging stroke to restore it to its full diameter and shape the dies operate to properly confine and compress the rim portion through the die face 11 and the ring die 24 and while the central mandrel 23 properly supports the metal at the axle eye to confine and reform the axle eye through the inward compression of the hub. The reforged wheel as thus produced may be then re-bored, when it is ready for use. In case it is desired to submit the wheel to the second forging operation it is inverted and subjected to like forging stroke between the dies 26 and 30 and so brought in like manner to finished shape, the hub or rim, or both, on the opposite side of the wheel being forged radially to properly fill out the tread and flange and complete the forging of the axle eye.

By means of the dies I am thus enabled to reforge the car wheel and bring it out to its original shape of both tread and flange and axle eye, while properly supporting and preventing distortion of the wheel, and especially of the web portion. If the wheel contains sufficient metal for the purpose it may in like manner be re-forged when again worn one or more times, so that a steel wheel, instead of forming ordinary scrap when worn, can by a relatively inexpensive operation have its life extended one or more times as found desirable, so largely reducing the cost of the use of steel wheels.

What I claim is:

In apparatus for reforging car wheels, the combination with a set of primary reforging dies including a stationary supporting anvil die, having annular hub, web and rim supporting faces, and tread and flange forging faces, and a movable forging die, having web and flange engaging faces, and having hub forging and rim forging shoulders respectively adapted to forge the hub face inwardly and the rim face outwardly, respectively, of a set of finishing reforging dies, including a stationary anvil die having supporting faces corresponding to the faces of the movable primary die, a movable ring die having tread, flange and rim engaging faces corresponding to those of the stationary primary die, and a movable die having web engaging faces and having hub and rim forging shoulders respectively, to forge the hub inwardly and to forge the rim outwardly against the tread face of said ring die to complete the reforging operation on the side of the wheel opposite to that operated upon by the primary reforging dies.

In testimony whereof, I the said JOHN M. HANSEN have hereunto set my hand.

JOHN M. HANSEN.

Witnesses:
ROBERT C. TOTTEN,
J. R. KELLER.

---

Copies of this patent may be obtained for five cents each, by addressing the "Commissioner of Patents, Washington, D. C."